May 20, 1924.
W. B. JOHNSON
HEADLIGHT
Filed April 14, 1922  2 Sheets-Sheet 1
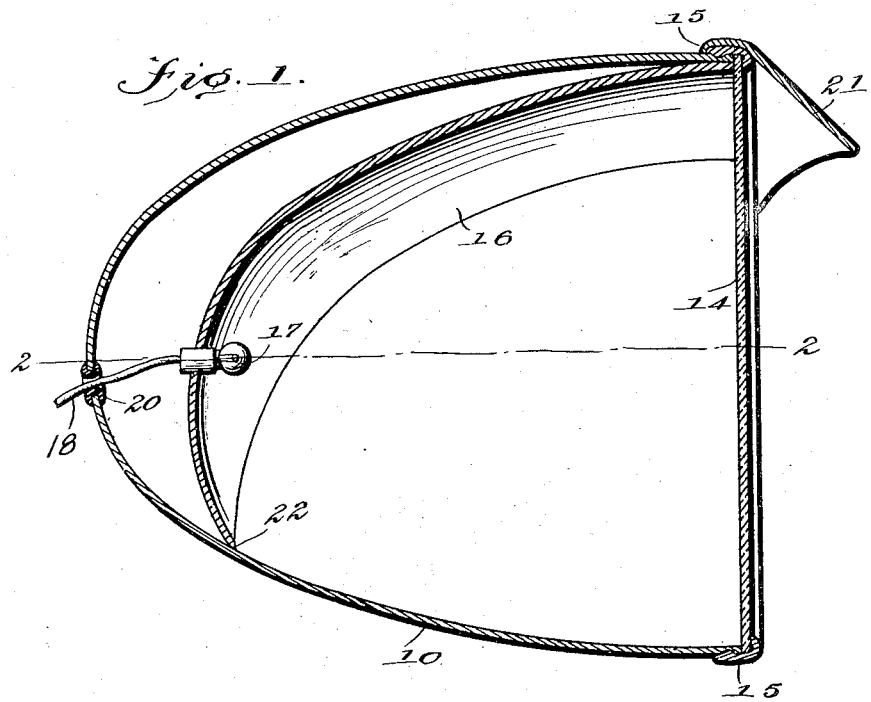
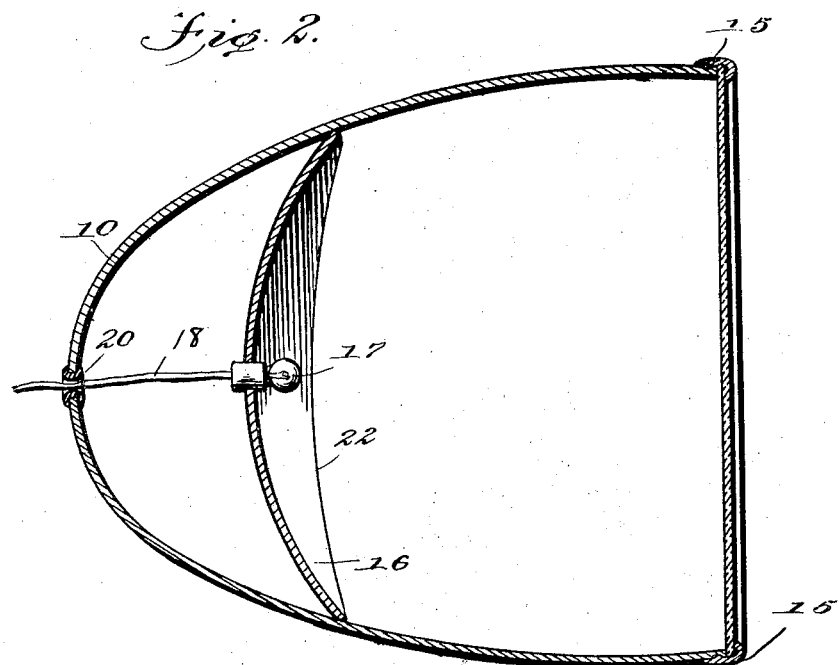
WITNESSES
INVENTOR
W. B. Johnson,
BY
ATTORNEYS

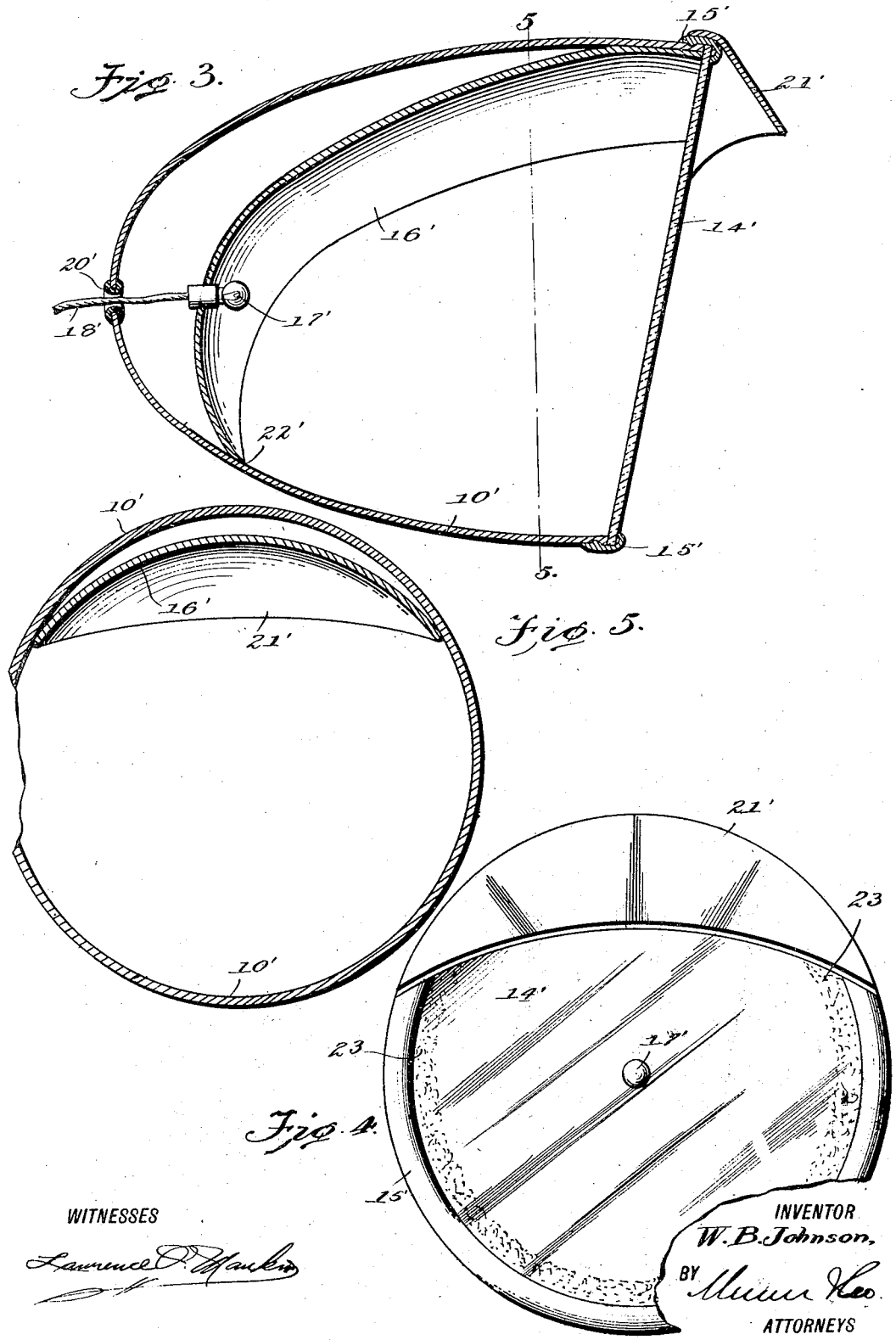

Patented May 20, 1924.

1,494,550

UNITED STATES PATENT OFFICE.

WILLIAM B. JOHNSON, OF WINCHESTER, KENTUCKY.

HEADLIGHT.

Application filed April 14, 1922. Serial No. 552,572.

*To all whom it may concern:*

Be it known that I, WILLIAM B. JOHNSON, a citizen of the United States, and resident of Winchester, in the county of Clark and State of Kentucky, have invented certain new and useful Improvements in Headlights, of which the following is a specification.

This invention relates to headlights for automobiles or other vehicles and the object thereof is to provide a headlight having reflecting means which will obviate the usual glare and projection of the light rays in an upward direction, but so constructed as to project sufficient light rays on the road and at the same time not interfere with any one walking or otherwise approaching in the direction of said headlights, by reason of blinding reflections in their eyes.

The invention therefore provides an improved headlight adapted to project the rays forwardly and downwardly without the upward reflection as is the case with all headlights universally in use at this time, except where the light has been retarded by some attachment or painting of the lens, all of which tends to reduce the value of the same as a headlight, thus obviating the projection of bright light rays above the headlights as placed on automobiles or the like and rendering it possible for any one to approach the car with safety, either in another vehicle or as a pedestrian.

A further object of the invention is to provide a headlight which will not only project the light rays at a greater intensity upon the ground or road surface in front of the car, so as to facilitate the navigation of certain roads or streets, but to cast or reflect the light rays in front of the wheels, especially on such makes of cars as Fords and other cars that do not hinder the lights by fenders extending over the front wheels and to indicate by a suitable colored lens portion on the left hand side of the car so that an automobile or other vehicle approaching in the opposite direction may be so steered as to pass without danger of collision especially if the light on the right hand side of the car should be extinguished.

With these and other objects in view, the invention consists in certain peculiarities of construction, novel arrangement and operation of the various parts thereof as will be hereinafter more fully set forth and specifically claimed.

In the accompanying drawings,

Figure 1 is a vertical longitudinal sectional view of one form of the headlight, Figure 2 is a horizontal cross sectional view taken on the line 2—2 of Figure 1, Figure 3 is a view similar to Figure 1 but showing a modified construction, Figure 4 is a front elevation partly broken away, and Figure 5 is a vertical sectional view taken on the line 5—5 of Figure 3.

Referring to the drawings in detail, in which for purposes of illustration is shown the preferred embodiment of the invention in which like reference characters designate corresponding parts throughout the several views, it will be seen by reference to Figure 1 that the improved headlight comprises an outer casing 10 of the usual or any preferred shape, but preferably of parabolic curvature, except that the same is elongated from the front to the rear to provide a relatively long casing. Within the casing 10 at the top, there is provided a reflector 16, the same being spaced from the rear portion of the casing 10.

As will be noted, the top reflector 16 joins the inner casing at the top and front portions of the latter and curves downwardly and forwardly for contact with outer casing 10 at 22, so as to reflect the rays forwardly and downwardly from the lamp 17 mounted in a suitable opening in the reflector 16 at the back and having a suitable conduit 18 leading through a bushing 20 mounted in an opening in the outer or main casing 10. Also, there is provided at the top and front portions of the lamp or casing, and around the retaining rim or ring 15, a hood or cap 21 curved to conform to the same and extending forwardly and downwardly so as to prevent the projection of rays upwardly by the reflector 16. This cap or hood 21 also forms a reflector to reflect the light rays projected thereagainst rearwardly and downwardly so that said light rays are combined with the forwardly and downwardly projected light rays from the reflector 16 to increase the intensity of the light rays projected forwardly and downwardly upon the road. It is further to be understood that the bottom wall 10 may or may not, but preferably is not designed to act as a reflector, thus preventing the projection of the light rays upwardly.

The lens 14 is provided with a pink or red border portion 23 which will not interfere with the proper projection of the light rays forwardly and upon the road nor reduce the light on the left hand side of the car to any appreciable extent but will give the desired signal effect to indicate to the operator of an approaching vehicle to permit clearance in passing, especially if the other headlight should be extinguished. At present where clear lenses are used on both headlights, and the left hand headlight is extinguished, accidents result because it cannot always be determined which light is extinguished and allowance made for clearance in passing. It is also understood that the upper portion of the lens may be frosted or otherwise provided to prevent the reflection of the light rays upwardly, in lieu of the cap or hood reflector 21 as described, or both may be used.

In Figures 3, 4 and 5 of the drawings, a modification is shown, in which the lower portion of the casing 10' is offset rearwardly at an angle so as to further insure the projection of the light rays forwardly and downwardly, and particularly downwardly immediately in front of the car and on the road. The parts in this form are indicated by the same characters primed as were used to designate corresponding parts of the form heretofore described. It will also be observed that the light bulb placed in the rear of the concaved reflector 16 will result in the light rays being projected forwardly and downwardly in addition to the downward and backward reflection by the cap or hood 21', the reflector extending upwardly and forwardly to the inclined lens as shown, thereby casting a maximum of light around the front wheels of such makes of cars as Fords and other cars that do not hinder the light by fenders extending over the front wheels. Also the casing and lens may be made round, oval or square, and suitable coloring means, preferably of red or pink color may be employed on the left hand side of the car to indicate the necessary clearance to permit the operator of an approaching vehicle to pass with safety.

In practice, the light rays from the rear reflector will be reflected centrally and directly forwardly, the strongest rays of the light covering the road at a distance of about 400' in front of the light, as placed on cars about three or four feet from the ground. If desired, the rear reflector can be made adjustable so as to regulate the reflection. This will prevent a blinding ray of light from interfering with travelers motoring in the opposite direction, as exemplified by the structure described and as constitute the important objects of the present invention. According to the shape of the casing, the lens may be made oblong, oval or square with rounded corners to suit.

All interior walls of the headlights not covered with reflectors will be covered with a paint having non-reflecting qualities.

While I have shown what I consider to be the preferred embodiments of my invention, it is understood that I may make such changes in the details of construction, shape and proportions of the various parts as are defined by the claim.

Having thus described the invention, what I claim is:—

A headlight comprising a casing of substantially parabolic shape, an elongated reflector disposed within the casing, said reflector being curved upwardly and rearwardly from its lateral edges toward its longitudinal median line from its front end for the greater part of its length and being curved downwardly and forwardly adjacent to its rearward end, the lateral edges of the reflector being in contact with the side walls of the casing and the lower edge of the rearward end portion of the reflector being in contact with the bottom wall of the casing, and a source of light positioned within the casing close to the inner wall of the reflector above the level of the lower edge of the reflector.

WILLIAM B. JOHNSON.